United States Patent
Chang et al.

(10) Patent No.: US 10,695,819 B2
(45) Date of Patent: Jun. 30, 2020

(54) SPIN FORMING METHOD FOR RIM OF CAST-SPUN ALUMINUM ALLOY HUB

(71) Applicant: CITIC Dicastal CO., LTD., Qinhuangdao, Hebei (CN)

(72) Inventors: Haiping Chang, Qinhuangdao (CN); Lijuan Zhang, Qinhuangdao (CN); Shiwen Xu, Qinhuangdao (CN); Xuepu Yin, Qinhuangdao (CN); Hongwei Zhou, Qinhuangdao (CN); Zhixue Wang, Qinhuangdao (CN); Rui Li, Qinhuangdao (CN); Jin Zhang, Qinhuangdao (CN); Dawei Xu, Qinhuangdao (CN)

(73) Assignee: CITIC DICASTAL CO., LTD., Qinhuangdao, Hebei (CN)

( * ) Notice: Subject to any disclaimer, the term of this patent is extended or adjusted under 35 U.S.C. 154(b) by 95 days.

(21) Appl. No.: 16/025,884

(22) Filed: Jul. 2, 2018

(65) Prior Publication Data
US 2019/0283107 A1    Sep. 19, 2019

(30) Foreign Application Priority Data
Mar. 19, 2018  (CN) .......................... 2018 1 0222400

(51) Int. Cl.
| | | |
|---|---|---|
| *B21D 53/30* | (2006.01) | |
| *B21H 1/10* | (2006.01) | |
| *B22D 25/02* | (2006.01) | |
| *B23P 15/00* | (2006.01) | |
| *B22D 21/00* | (2006.01) | |

(52) U.S. Cl.
CPC .............. *B21D 53/30* (2013.01); *B21H 1/10* (2013.01); *B22D 25/02* (2013.01); *B23P 15/00* (2013.01); *B22D 21/007* (2013.01); *B23P 2700/50* (2013.01)

(58) Field of Classification Search
CPC ........ B21D 53/30; B21D 53/26; B21D 22/16; B23P 15/00; B23P 2700/50; B22D 25/02; B22D 21/007; B22D 18/04; B21H 1/10; B60B 3/06
See application file for complete search history.

(56) References Cited

U.S. PATENT DOCUMENTS

| | | | |
|---|---|---|---|
| 4,579,604 A | 4/1986 | Beyer | |
| 6,536,111 B1* | 3/2003 | Baumgarten | .......... B21D 53/30 164/302 |

FOREIGN PATENT DOCUMENTS

| | | |
|---|---|---|
| CN | 102950240 A | 3/2013 |
| CN | 103056611 A | 4/2013 |

(Continued)

*Primary Examiner* — Rick K Chang
(74) *Attorney, Agent, or Firm* — Cooper Legai Group, LLC

(57) ABSTRACT

The present disclosure discloses a method for forming a rim of a cast-spun aluminum alloy hub, that is, a special spinning composite machining method for forming a structure that the spokes and the inner wheel flange of the hub are cast and the middle of the rim is spun. The method can prevent the performance, strength and as-cast structure of the inner wheel flange from being destroyed, effectively improve the impact resistance of the cast-spun hub at the inner wheel flange, prevent the inner wheel flange of the cast-spun hub from cracking during radial impact and improve the performance of the spun structure of the rim, is beneficial to thinning the rim and realizes light weight of the rim.

3 Claims, 3 Drawing Sheets

(56) References Cited

FOREIGN PATENT DOCUMENTS

| CN | 203470594 U | 3/2014 |
| CN | 104227349 A | 12/2014 |
| JP | H04167943 A | 6/1992 |

* cited by examiner

SPIN FORMING METHOD FOR RIM OF CAST-SPUN ALUMINUM ALLOY HUB

CROSS-REFERENCE TO RELATED APPLICATION

The present application claims benefit of Chinese Patent Application No. 201810222400.5, filed on Mar. 19, 2018, the contents of which are hereby incorporated by reference in its entirety.

BACKGROUND

The cast-spun (cast and spun) aluminum alloy hub has been widely applied in the field of cars due to the advantages of fast heat dissipation, light weight, energy conservation, good comfort, attractive appearance and the like. The machining process is that the spokes and the thick rim are formed by low pressure casting, and the thick as-cast rim is then made into the proper size and shape through strong thermal spinning. After thermal spinning, most metal grains of the rim become thinner and have a distinct fibrous structure, which greatly improves the overall strength and corrosion resistance of a wheel.

When the metal at the part A of the as-cast rim is spun by a spinning roller and then filled into the spun inner wheel flange B, the deformation of the as-cast structure is insufficient, the spun structure streamlines are not obvious, and the original as-cast structure is destroyed, so that the inner wheel flange B cracks when the hub is subjected to a large radial impact load, seriously affecting the safety of an automobile.

SUMMARY

The present disclosure relates to the field of automobile hub manufacturing, and specifically, to a composite spin forming method for a rim of a cast-spun aluminum alloy hub.

The objective of the present disclosure is to provide a method for forming a rim of a cast-spun aluminum alloy hub, that is, a special spinning composite machining method for forming a structure that the spokes and the inner wheel flange of the hub are cast and the middle of the rim is spun.

The original rim spinning method is: performing strong spinning on the cast rim to form a spun rim. After the position A of the cast rim is spun, it becomes a position B of the inner wheel flange of the spun rim. The as-cast structure of the position A spun by a spinning roller is damaged and deforms insufficiently, so that the structure of the position B represents anisotropy, the strength decreases, and the position B cracks under a large radial load.

In order to solve the above technical problems, the present disclosure adopts the following technical solution: a spin forming method for a rim of a cast-spun aluminum alloy hub, the inner wheel flange C of a new cast rim and the inner wheel flange D of a new spun rim are set to be identical in shape, the new cast rim 4 is spun into the new spun rim by three spinning rollers, at the same time, the inner wheel flange C of the new cast rim is formed to the inner wheel flange D of the new spun rim, that is, C is superposed with D. The middle part of the new rim of the cast-spun hub is formed by spinning, and both the spokes connected with the middle part and the inner wheel flange D area of the new spun rim are of cast structures.

In consideration with feeding at the inner wheel flange D, the feeding channel of the new cast rim is set at 13.5-15 mm; and in order to ensure sequential solidification of the cast rim, the inside inclination angle α of the new cast rim blank, the outside inclination angle β of the new cast rim blank and the wheel well have certain structural gradient.

A casting mold for the new cast rim is cooled with water. In the casting process, the preheating temperature of the mold is 320-380° C., the temperature of molten aluminum is 690-710° C., the holding pressure is 830-860 mbar, the holding time is 130-150 s, the cooling time after pressure relief is 25-35 s, the production cycle is improved from original 5.5-6.5 min/piece to 3.8-4.5 min/piece, the casting production efficiency is improved by more than 30%, the elongation of the rim is improved to 10%, and the elongation of the inner wheel flange can be improved to 12%. The strength of the spun rim can be further improved by improving the strength of the cast rim, that is, the wall thickness of the rim can be further reduced to 2-3 mm, which is beneficial to the weight reduction of a wheel product of the cast-spun hub. At the same time, the water-cooled mold saves the cost of compressed air so as to reduce the manufacturing cost.

Strong thermal spinning is performed on the high-temperature new cast rim by adopting three times of vertical spinning, that is, three spinning rollers in different shapes are adopted for spin forming of the cast rim according to different spinning trajectories.

According to the strong thermal spinning process, in the case where the structure of the existing spinning mold is not changed, the fillet radius of each spinning roller is set at R6.5-R25, and the forming angle is 10-35°. During forming, the blank heating temperature is controlled at 350-380° C., and the initial temperature of the mold is controlled at 250-300° C. The total thinning rate of the cast blank is not less than 65%, the thinning rate of each spinning with a spinning roller is 15%-35%, the offset distances of the spinning rollers are 2-5 mm, the feed rates are 500-1200 mm/min, the revolving speed of a spinning machine spindle is 400-600 r/min, the tail cap pressure is set at 3.5-6 Mpa, and the spinning time is 45-60 s.

Compared with the prior art, the beneficial effects of the present disclosure are as follows: (1) the low pressure casting strong cooling process is adopted at the inner wheel flange, so that the strength is improved, and the radial impact resistance and the pressure casting efficiency of the rim are improved; (2) the middle of the rim has large deformation by means of spinning, so that the performance of the rim is improved, the metal streamline structure is improved, and thinning of the rim and light weight of the automobile hub are facilitated; and (3) the spinning process is suitable for forming of the rim, and the process is simple and has a good promotion value.

LIST OF REFERENCE SYMBOLS

Figure 1:
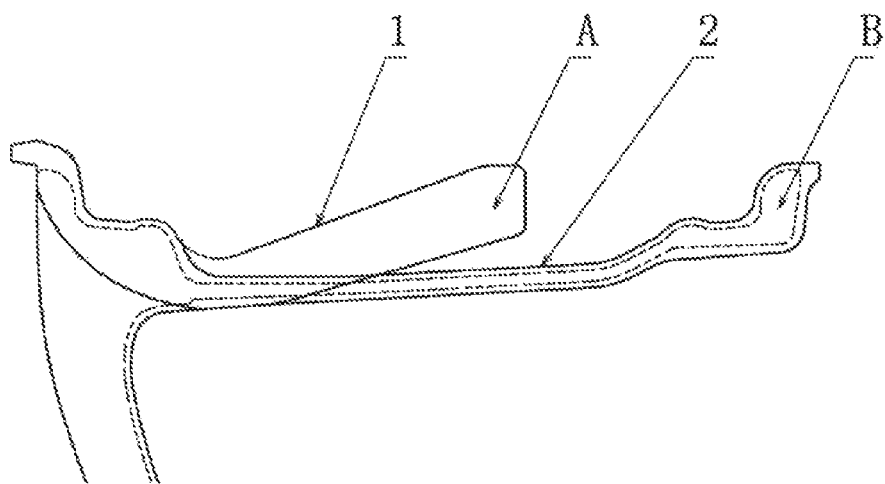
FIG. 1 is a schematic diagram of forming of an original cast structured rim.
Figure 2:
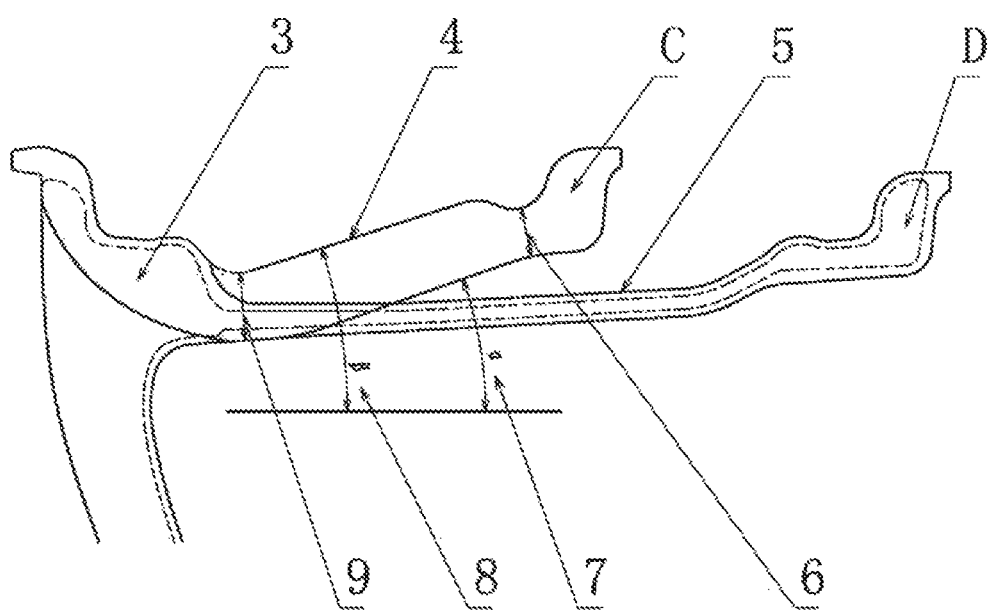
FIG. 2 is a schematic diagram of forming of a new cast structured rim according to the present disclosure.
Figure 3:
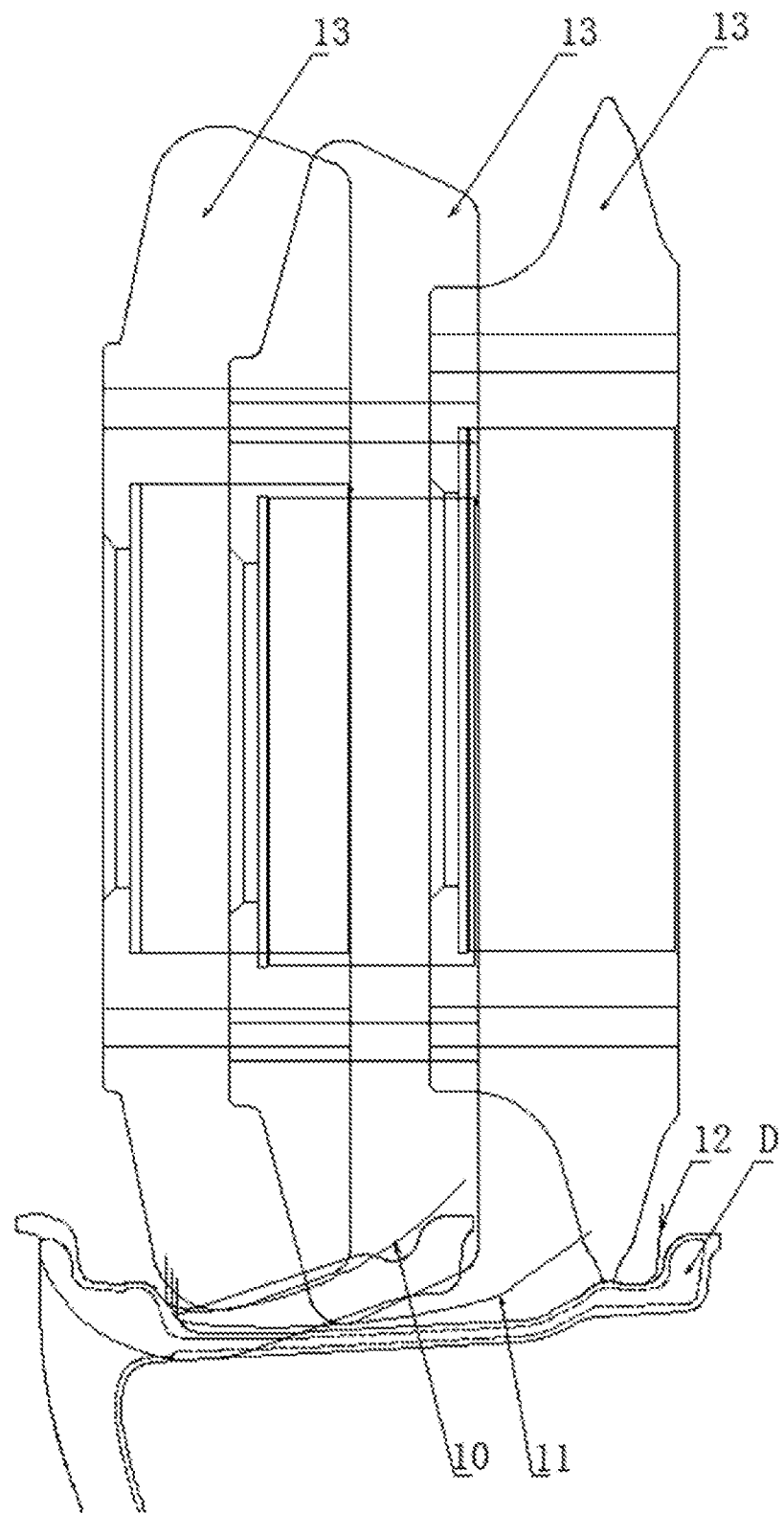
FIG. 3 is a schematic diagram of spin forming according to the present disclosure.

1—original cast rim, 2—original spun rim, 3—spoke, 4—new cast rim, 5—new spun rim, 6—feeding channel, 7—inside inclination angle of new cast rim blank, 8—outside inclination angle of new cast rim blank, 9—wheel well, 10—spinning roller trajectory for the first spinning, 11—spinning roller trajectory for the second spinning, 12—spinning roller trajectory for the third spinning, 13—spinning roller, A—original cast rim inner wheel flange, B—original spun inner wheel flange, C—new cast rim inner wheel flange, D—new spun inner wheel flange.

DETAILED DESCRIPTION

The technical solution of the present disclosure will be further specifically described below through embodiments and in combination with the accompanying drawings.

In an embodiment, a feeding channel 6 of a new cast rim 4 is set at 13.5 mm; in order to ensure sequential solidification of the cast rim, the inside inclination angle 7 α of the blank of the new cast rim 4 is 19°, the outside inclination angle 8 β of the blank of the new cast rim 4 is 18°, and the thickness of a wheel well 9 is 18.6 mm, so that the new cast rim 4 has certain structural gradient.

A casting mold for the casting process of the new cast rim 4, especially the inner wheel flange, is cooled with water. The preheating temperature of the casting mold is 320° C., the temperature of molten aluminum is 690° C., the holding pressure is 830 mbar, the holding time is 130 s, the cooling time after pressure relief is 25 s, the production cycle is improved from original 5.5 min/piece to 3.8 min/piece, and the casting production efficiency is improved by 30.9%. The elongation of the rim is improved to not less than 10%, and the elongation of the inner wheel flange can be improved to not less than 12%. The strength of the spun rim can be further improved by improving the strength of the cast rim, that is, the wall thickness of the rim can be reduced to 2.5 mm. At the same time, the water-cooled mold dispenses with air cooling, saves the cost of compressed air and reduces the manufacturing cost by 1.2 yuan.

The new cast rim 4 is spun at a temperature of 360° C., and three times of vertical spinning are adopted, with the spinning roller trajectory for the first spinning being 10, the spinning roller trajectory for the second spinning being 11 and the spinning roller trajectory for the third spinning being 12.

According to the new spinning process, in the case where the structure of the existing spinning mold is unchanged, the fillet radius of a first spinning roller is R25 and the forming angle is 20°, the fillet radius of a second spinning roller is R12.5 and the forming angle is 25°, and the fillet radius of a third spinning roller is R6.5 and the forming angle is 35°. During forming, the initial temperature of a spinning mold is controlled at 250° C. The total thinning rate of the cast blank is 69.6%, the thinning rates of the three times of spinning with the spinning rollers 13 are respectively 40%, 34.5% and 26.3%, the offset distances of the spinning rollers 13 are respectively 2 mm and 3.5 mm, the feed rates of the spinning rollers 13 are respectively 500 mm/min, 600 mm/min and 900 mm/min, the revolving speed of a spinning machine spindle is 400 r/min, the tail cap pressure is set at 3.5 Mpa, and the spinning time is 60 s.

The performance parameters of the aluminum alloy cast-spun hub formed by the above steps are shown in the table:

TABLE 1

| Cast-spun hub | Yield strength MPa | Tensile strength MPa | Elongation % |
|---|---|---|---|
| Inner wheel flange | 220 | 292 | 12 |
| Rim | 222 | 295 | 13.5 |
| Spokes | 194 | 265 | 7.2 |

It can be seen from table 1 that the cast-spun hub manufactured in embodiment 1 has the advantages that the performance of the rim is good, thinning of the rim is facilitated, the strength of the inner wheel flange is high, the structure is uniform and the radial impact resistance is improved.

In another email, a feeding channel 6 of a new cast rim 4 is set at 15 mm; in order to ensure sequential solidification of the cast rim, the inside inclination angle 7 α of the blank of the new cast rim 4 is set at 19°, the outside inclination angle 8 β of the blank of the new cast rim 4 is set at 16°, and the thickness of a wheel well 9 is set at 19.5 mm, so that the new cast rim 4 has certain structural gradient.

A casting mold for the casting process of the new cast rim 4, especially the inner wheel flange, is cooled with water. The preheating temperature of the casting mold is 380° C., the temperature of molten aluminum is 700° C., the holding pressure is 860 mbar, the holding time is 150 s, the cooling time after pressure relief is 35 s, the production cycle is improved from original 6.5 min/piece to 4.5 min/piece, the casting production efficiency is improved by 30.7%, the elongation of the rim is improved to not less than 11%, and the elongation of the inner wheel flange can be improved to not less than 13%. The strength of the spun rim can be further improved by improving the strength of the original cast rim, that is, the wall thickness of the rim can be further reduced to 2.2 mm, which is beneficial to the weight reduction of a wheel product of the cast-spun hub. At the same time, the water-cooled mold dispenses with air cooling, saves the cost of compressed air and reduces the manufacturing cost by 1.35 yuan.

The new cast rim 4 is spun at a temperature of 380°, and three times of vertical spinning are adopted, with the spinning roller trajectory for the first spinning being 10, the spinning roller trajectory for the second spinning being 11 and the spinning roller trajectory for the third spinning being 12.

According to the spinning process, in the case where the structure of the existing spinning mold is unchanged, the fillet radius of a first spinning roller is R25 and the forming angle is 20°, the fillet radius of a second spinning roller is R11 and the forming angle is 28°, and the fillet radius of a third spinning roller is R7 and the forming angle is 35°. During forming, the initial temperature of a spinning mold is controlled at 300°. The total thinning rate of the cast blank is 69.6%, the thinning rates of the three times of spinning with the spinning rollers 13 are respectively 47.8%, 29.2% and 17.63%, the offset distances of the spinning rollers 13 are respectively 3 mm and 2.5 mm, the feed rates of the spinning rollers 13 are respectively 600 mm/min, 750 mm/min and 1100 mm/min, the revolving speed of a spinning machine spindle is 550 r/min, the tail cap pressure is set at 4.5 Mpa, and the spinning time is 45 s.

The performance parameters of the aluminum alloy cast-spun hub formed by the above steps are shown in table 2:

TABLE 2

| Cast-spun hub | Yield strength MPa | Tensile strength MPa | Elongation % |
|---|---|---|---|
| Inner wheel flange | 226 | 298 | 12.6 |
| Rim | 232 | 302 | 14.2 |
| Spokes | 196 | 270 | 8.3 |

It can be seen from table 2 that the cast-spun hub manufactured in embodiment 2 has the advantages that the performance of the rim is good, thinning of the rim is facilitated, the strength of the inner wheel flange is high, the structure is uniform and the radial impact resistance is improved.

The foregoing descriptions are merely preferred embodiments of the present disclosure but are not intended to limit the patent scope of the present disclosure. Any equivalent modifications made to the structures or processes based on the specification of the present disclosure, or direct or indirect use in other relevant technical fields, shall also be encompassed in the patent protection scope of the present disclosure.

The invention claimed is:

1. A spin forming method for a rim of a cast-spun aluminum alloy hub, wherein the method comprises:
    a step of providing a new cast rim; and
    a forming step of spinning the new cast rim by three spinning rollers to form a new spun rim, wherein an inner wheel flange of the new cast rim is formed to a location of an inner wheel flange of the new spun rim, wherein
    a feeding channel of the new cast rim is set at 13.5-15 mm; an inside inclination angle α of a blank of the new cast rim, an outside inclination angle β of the blank of the new cast rim and a wheel well have a structural gradient;
    wherein, in the step of providing the new cast rim, a casting mold for the new cast rim is cooled with water;
    wherein, parameters used in the step of providing the new cast rim are as follows: a preheating temperature of the casting mold is 320-380° C., a temperature of molten aluminum is 690-710° C., a holding pressure is 830-860 mbar, a holding time is 130-150 s, and a cooling time after pressure relief is 25-35 s;
    wherein the step of spinning the new cast rim by the three spinning rollers to form the new spun rim comprises performing thermal spinning on the new cast rim by the three spinning rollers in different shapes according to different spinning trajectories;
    wherein a fillet radius of each spinning roller of the three spinning rollers is set at R6.5-R25, and a forming angle is 10-35°; and
    wherein, during the forming step, a heating temperature of the blank of the new cast rim is controlled at 350-380° C., and an initial temperature of the casting mold is controlled at 250-300° C.; a total thinning rate of the blank of the new cast rim is not less than 65%, a thinning rate for each spinning with a spinning roller of the three spinning rollers is 15%-35%, offset distances of the three spinning rollers are 2-5 mm, feed rates of the three spinning rollers are 500-1200 mm/min, a revolving speed of a spinning machine spindle is 400-600 r/min, a tail cap pressure is set at 3.5-6 Mpa, and a spinning time is 45-60 s.

2. The spin forming method for a rim of a cast-spun aluminum alloy hub according to claim 1, wherein the feeding channel of the new cast rim is set at 13.5 mm; the inside inclination angle α of the blank of the new cast rim is 19°, the outside inclination angle β of the blank of the new cast rim is 18°, and a thickness of the wheel well is 18.6 mm;
    wherein the parameters used in the step of providing the new cast rim are as follows: the preheating temperature of the casting mold is 320° C., the temperature of the molten aluminum is 690° C., the holding pressure is 830 mbar, the holding time is 130 s, and the cooling time after pressure relief is 25 s;
    wherein the new cast rim is spun at a temperature of 360° C.; the fillet radius of a first spinning roller of the three spinning rollers is R25 and the forming angle is 20°, the fillet radius of a second spinning roller of the three spinning rollers is R12.5 and the forming angle is 25°, and the fillet radius of a third spinning roller of the three spinning rollers is R6.5 and the forming angle is 35°; and
    wherein, during the forming step, the initial temperature of the casting mold is controlled at 250° C.; the total thinning rate of the blank of the new cast rim is 69.6%, the thinning rates of the three times of spinning with the three spinning rollers are 40%, 34.5% and 26.3% respectively, the offset distances of the three spinning rollers are 2 mm and 3.5 mm respectively, the feed rates of the three spinning rollers are 500 mm/min, 600 mm/min and 900 mm/min respectively, the revolving speed of the spinning machine spindle is 400 r/min, the tail cap pressure is set at 3.5 Mpa, and the spinning time is 60 s.

3. The spin forming method for a rim of a cast-spun aluminum alloy hub according to claim 1, wherein the feeding channel of the new cast rim is set at 15 mm; the inside inclination angle α of the blank of the new cast rim is set at 19°, the outside inclination angle β of the blank of the new cast rim is set at 16°, and a thickness of the wheel well is 19.5 mm;
    wherein the parameters used in the step of providing the new cast rim are as follows: the preheating temperature of the casting mold is 380° C., the temperature of the molten aluminum is 700° C., the holding pressure is 860 mbar, the holding time is 150 s, and the cooling time after pressure relief is 35 s;
    wherein the new cast rim is spun at a temperature of 380° C.; the fillet radius of a first spinning roller of the three spinning rollers is R25 and the forming angle is 20°, the fillet radius of a second spinning roller of the three spinning rollers is R11 and the forming angle is 28°, and the fillet radius of a third spinning roller of the three spinning rollers is R7 and the forming angle is 35°; and
    wherein, during the forming step, the initial temperature of the casting mold is controlled at 300° C.; the total thinning rate of the blank of the new cast rim is 69.6%, the thinning rates of the three times of spinning with the three spinning rollers are 47.8%, 29.2% and 17.63% respectively, the offset distances of the three spinning rollers are 3 mm and 2.5 mm respectively, the feed rates of the three spinning rollers are 600 mm/min, 750 mm/min and 1100 mm/min respectively, the revolving speed of the spinning machine spindle is 550 r/min, the tail cap pressure is set at 4.5 Mpa, and the spinning time is 45 s.

* * * * *